United States Patent Office 2,725,389
Patented Nov. 29, 1955

2,725,389

13-METHYL-17-ETHYNYL - 17 - HYDROXY - 1,2,3,4,-6,7,8,9,11,12,13,14,16,17 - TETRADECAHYDRO-15H - CYCLOPENTA [a] PHENANTHREN -3- ONE AND ITS PREPARATION

Frank B. Colton, Chicago, Ill., assignor to G. D. Searle & Co., Chicago, Ill., a corporation of Illinois No Drawing. Application August 31, 1953,
Serial No. 377,703

1 Claim. (Cl. 260—397.4)

The present invention relates to a new $\Delta^{5:10}$-steroid and, specifically, to the 13-methyl-17-ethynyl-17-hydroxy-1,2,3,4,6,7,8,9,11,12,13,14,16,17-tetradecahydro - 15H-cyclopenta[a]phenanthren-3-one of the structural formula

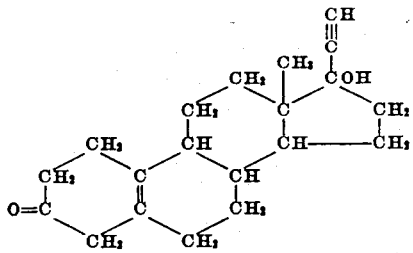

This compound is an orally effective drug possessing valuable hormonal properties. More specifically, it produces the therapeutic effects of ovarian hormones but lacks some of the secondary effects of these compounds. A procedure for the preparation of the claimed compound is described in my copending application Serial No. 357,376, filed May 25, 1953, of which the present application is a continuation-in-part. A convenient starting material is the 3-methoxy-13-methyl-1,4,6,7,8,9,11,-12,13,14,16,17-dodecahydro - 15H - cyclopenta[a]phenanthren-17-one, described in my copending application, Serial No. 286,611, filed May 7, 1952, which has issued as U. S. Patent 2,655,518.

The following examples illustrate in further detail the procedures used in the practice of my invention and the compounds prepared thereby. However, the invention is not to be construed as limited by the details set forth in spirit or in scope. It will be apparent to those skilled in the art that many modifications in materials and methods may be practiced without departing from the invention. In these examples, temperatures are given in degrees centigrade (° C.) and relative amounts of materials in parts by weight.

Example 1

A stirred solution of 10.6 parts of 3-methoxy-13-methyl-1,4,6,7,8,9,11,12,13,14,16,17 - dodecahydro - 15H-cyclopenta[a]phenanthren-17-one in 700 parts of anhydrous ether and 45 parts of dry toluene is cooled to 0° C. and saturated with dry acetylene. While a slow stream of acetylene is passed through the reaction mixture, a solution of 20 parts of potassium t-amylate in 135 parts of anhydrous t-pentanol is added in the course of 15 minutes with stirring. Passage of acetylene and stirring are continued for an additional 4½ hours. After standing at 0° C. for 16 hours, the mixture is washed with aqueous ammonium chloride solution until the aqueous phase is neutral, then with water and saturated sodium chloride solution. The organic layer is dried over anhydrous sodium sulfate, filtered and concentrated under vacuum to a residue of about 250 parts. 500 parts of petroleum ether are added and after standing at 0° C. for an hour, the mixture is filtered. The collected precipitate is recrystallized from ether. The resulting 3-methoxy - 13-methyl - 17-ethynyl-1,4,6,7,8,9,11,12,13,-14,16,17-dodecahydro - 15H - cyclopenta[a]phenanthren-17-ol melts at about 181–182° C. The rotation as determined in a 1% chloroform solution is $[\alpha]_D = +65°$. An additional amount of this product can be obtained from the mother liquors by concentration under vacuum followed by addition of petroleum ether.

Example 2

To a refluxing solution of 10 parts of 3-methoxy-17-ethynyl - 17-hydroxy-13-methyl-1,4,6,7,8,9,11,12,13,14,16, 17-dodecahydro-15H-cyclopenta[a]phenanthrene in 500 parts of methanol, 20 parts of glacial acetic acid are added. Refluxing is continued for 7 minutes, water is added to the point of turbidity and the reaction mixture is permitted to come to room temperature. The precipitate is collected on a filter and recrystallized from aqueous methanol. The 13-methyl-17-ethynyl-17-hydroxy-1,2,3,4,6,7,8,9,11,12,13,14,16,17-tetradecahydro - 15H-cyclopenta[a]phenanthrene-3-one thus obtained melts at about 699–170° C. A 1% chloroform solution shows an optical rotation $[\alpha]_D = +108°$. The infrared absorption spectrum shows maxima at 2.78, 3.1 and 5.83 microns.

I claim:
A compound of the structural formula

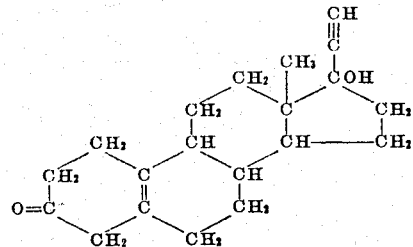

References Cited in the file of this patent

UNITED STATES PATENTS 2,272,131    Ruzicka _____ Feb. 3, 1942